July 17, 1951 W. R. TEEL 2,560,905
FISHING APPLIANCE
Filed Nov. 17, 1948
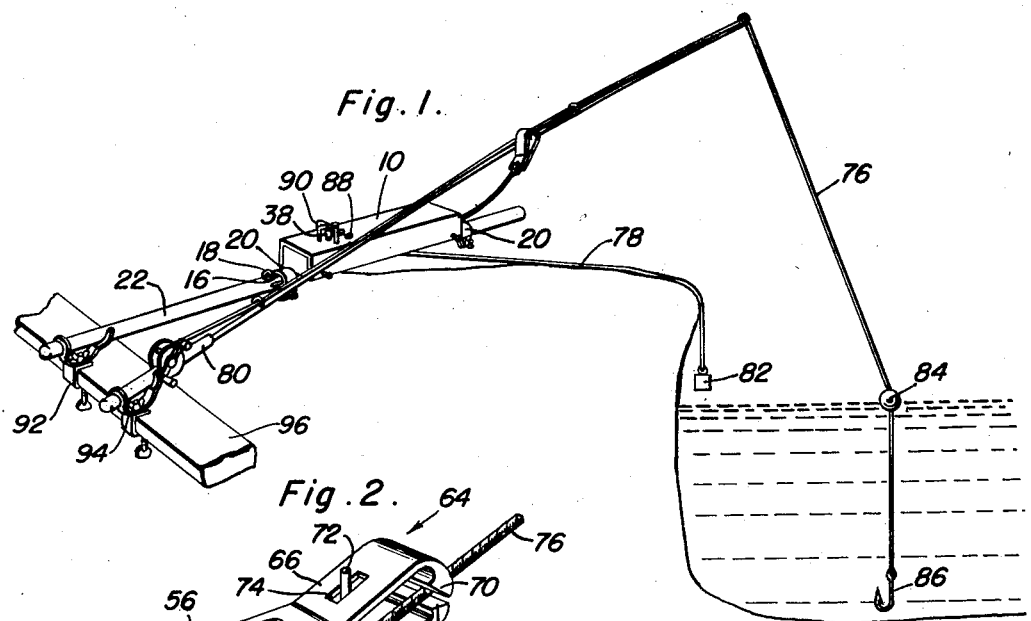
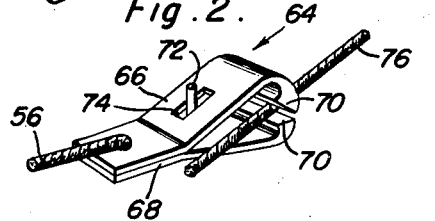
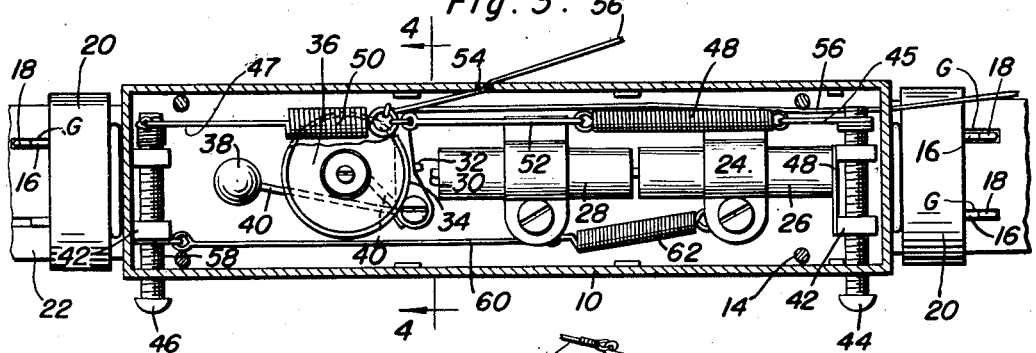
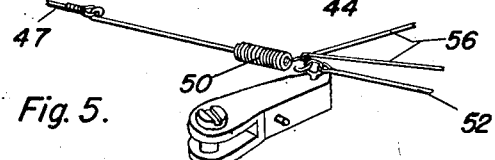
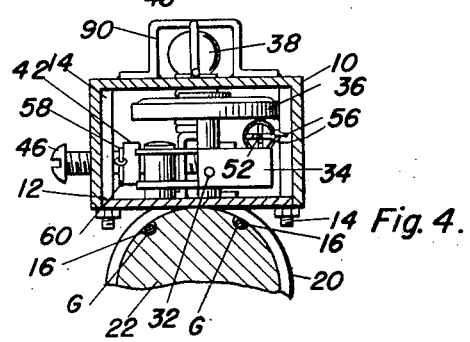
William R. Teel
INVENTOR.

Patented July 17, 1951

2,560,905

UNITED STATES PATENT OFFICE 2,560,905

FISHING APPLIANCE

William R. Teel, Centrahoma, Okla., assignor of one-half to A. W. White, Colby, Kans.

Application November 17, 1948, Serial No. 60,492

6 Claims. (Cl. 43—17)

This invention relates to new and useful improvements in fishing appliances and more particularly to an electrically operated signal device for use in fishing.

The primary object of the present invention is to provide a signal device including an electrically operated alarm, a switch controlling the alarm, and embodying novel and improved pressure actuated means for operating said switch.

Another important object of the present invention is to provide an electrical signal, a switch controlling the signal, and an operating line for the switch supporting a float that will descend with a fluid medium to effect a pulling action on the line and thus move the switch to a circuit closing position during low tide.

A further object of the present invention is to provide an electrically operated signal, a switch for the signal, a pull line for moving the switch to a circuit closing position, and embodying novel and improved means acting against the action of said pull line and which is adjustable whereby a predetermined pressure is necessary on the line to actuate the switch.

A still further aim of the present invention is to provide a signal device of the aforementioned character that is extremely small and compact in structure and which includes novel and improved means for detachably securing the same relative to a rod or pole.

Other objects and advantages reside in the details of construction and operation as more fully hereinafter described and claimed, reference being had to the accompanying drawings forming part hereof, wherein like numerals refer to like parts throughout, and in which:

Figure 1 is a diagrammatic perspective view showing the present invention in use;

Figure 2 is a fragmentary perspective view showing the clamping means used in conjunction with the present invention;

Figure 3 is a longitudinal, horizontal sectional view of the housing used in conjunction with the present invention;

Figure 4 is a transverse vertical sectional view taken substantially on the plane of section line 4—4 of Figure 3 and showing the housing applied to a supporting pole; and Figure 5 is a fragmentary perspective view showing the manner in which the operating line is connected to the switch.

Referring now to the drawings in detail, wherein for the purpose of illustration, there is disclosed a preferred embodiment of the present invention, the numeral 10 represents an elongated substantially rectangular housing or casing having a removable lower wall 12 that is secured to the housing 10 by fasteners or the like 14.

A pair of spaced parallel bars 16 are fixed to the bottom wall or closure 12 and include end portions that project outwardly from the casing 10 and which terminate in retainer loops or stops 18.

Split clamps 20 embrace the outer ends of the bars 16 and are employed for detachably securing the casing 10 to a supporting post or structure 22 and the bars 16 will be seated in a pair of grooves or recesses G provided in the post 22.

Detachably supported in suitable brackets or clamps 24 mounted on the bottom wall 12, is a plurality of batteries 26 and 28 the rear battery 28 having a terminal 30 that is spaced normally from the contact tip 32 of a pivotal switch member 34 which is mounted on the bottom wall 12.

Also mounted on the bottom wall 12, is an electrically operated sound signal 36 and a visual signal or lamp 38 that are connected by conductors 40 to the switch member 34 so that the signals 36 and 38 will be simultaneously energized by the batteries 26 and 28 when the contact tip 32 of the switch member 34 engages the terminal 30 of battery 28.

Rising from the bottom wall 12, at each end thereof, is a pair of ears 42 that receivably engage a pair of spaced fasteners or bolts 44 and 46. The ears supporting the fastener 44 support a ground plate 48 that engages the base portion of the forward battery 26.

Suitably anchored to the bolts 44 and 46, is a pair of flexible elements or members 45 and 47 which are wound about the said bolts and which include free end portions that are joined by a plurality of resilient members 48 and 50 and a connecting link 52. The resilient member 50 is also connected to the switch 34 and will function with the resilient member 48 to urge the switch 34 to a normally circuit open position.

Extending into the casing 10 through a slot 54 therein, is one end of a flexible element or line 56 that is looped about one eye end of the resilient member 50 and which then extends forwardly through the forward wall of the casing 10 so that a pull on either end of the line 56 will force the switch 34 toward the battery 28 and the tip 32 against the terminal 30.

By adjusting either or both of the bolts 44 and 46, a predetermined force will be necessary in order for the line 56 to overcome the action of the resilient members 48 and 50.

In order to retain the bolt 46 in a selected adjusted position, against rotation, there is provided a brake ring 58 that embraces the bolt 46 and which is anchored to one of the brackets 24 by a link 60 and a resilient member or spring 62.

The numeral 64 represents the clamping member that is used in conjunction with the present invention generally, and which includes a pair of resilient jaws 66 and 68 which are fixed at one of their ends to each other. These jaws include normally engaged gripping portions 70.

A finger receiving lug 72 is fixed to one of the jaws, for example jaw 68, and is loosely received in a slot 74 in the jaw 66 whereby the gripping portions 70 may be spaced.

One of the aforedescribed clamping members 64 is applied to each end of the line 56 and engages a further pair of lines 76 and 78, the line 76 being mounted on a fishing pole 80, and the line 76 extending to a body of water and supporting a float 82. A float 84 is also applied to the line 76 and supports a fish hook 86.

The upper wall of the housing 10 is apertured as at 88, so that sound emitted from the signal 36 will be easily heard, and the lamp 38 projects partially from the housing 10 and is shielded by suitable guards 90.

In practical use of the present invention, a pair of supports 92 and 94 are mounted on a supporting structure element 96 and respectively support the post 22 and rod 80.

In practical use of the present invention, a pair of supports 92 and 94 are mounted on a supporting structure element 96 and respectively support the post 22 and rod 80.

When a fish strikes the hook 86, the end of the line 56 supporting the hook will move forwardly swinging the switch 34 into circuit closing position, sounding the alarm or signal 36 and the alarm or signal 38 will be illuminated.

The float 82 normally lies upon the surface of the fluid medium and the line 78 is relatively taut. When the water level descends, due to low tide, the weight of the float 82 will exert a downward pull on the line 78 to move the switch 34 to a circuit closing position.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fish appliance comprising a casing, a group of batteries mounted in said casing, an electrically operated signal, a pivotal switch electrically connected to the signal and adapted to complete a circuit between said signal and said batteries, means normally urging said switch to a circuit-open position, and a flexible line for forcing said switch into circuit-closing position, said means normally urging said switch to circuit open position including a pair of spaced parallel fasteners adjustably carried by said casing, a pair of flexible members wound about said fasteners, and a resilient connection between said members.

2. A fish appliance comprising an elongated casing having a forward end wall and a side wall, a swingable switch mounted in the casing, a pair of spaced parallel threaded rods, said casing including means threadingly receiving the rods, a pair of flexible members wound on said rods, a resilient connection between the flexible members, said connection also being connected to said switch for yieldingly urging the switch to a circuit-open position, said end wall and said side wall each having an opening therein, an electrical signal in the casing having a circuit controlled by said switch, and a fishing line having its central portion attached to said switch and its ends received in said openings, said switch being moved to a circuit-closing position to complete the circuit to the signal upon a pull on either end of said line.

3. A fishing appliance comprising a casing having a battery mounted therein, an electrical signal carried by the casing, a pivot mounted in said casing adjacent the battery, a switch arm pivoted on said pivot and having a contact lip for engaging the battery terminal, means electrically connecting said arm to said signal, means normally urging the arm spaced from the battery terminal, said last mentioned means including a spring having one end secured to said arm, a rotatable member carried by the casing and a flexible element wound about said member and connected to the other end of said spring, means holding said member in a selected rotated position, and means for forcing said arm toward the battery terminal.

4. A fishing appliance comprising a casing having a battery mounted therein, an electrical signal carried by the casing, a pivot mounted in said casing adjacent the battery, a switch arm pivoted on said pivot and having a contact lip for engaging the battery terminal, means electrically connecting said arm to said signal, means normally urging the arm spaced from the battery terminal, said last mentioned means including a spring having one end secured to said arm, a rotatable member carried by the casing and a flexible element wound about said member and connected to the other end of said spring, a ring embracing said member, means yieldingly urging said ring against the member to restrict rotation of the latter, and means for forcing the arm toward the battery terminal.

5. The combination of claim 4 wherein said means yieldingly urging the ring against the member includes a coil spring anchored at one end to the casing, and a pitman connecting the free end of said coil spring to said ring.

6. The combination of claim 3 wherein said last named means includes a bolt carried by said casing, a spring connected to the arm, a cord carried by the spring and embracing the bolt, and a fishing line having one end applied to the arm, said bolt being rotatable to wind the cord thereon in order to require a predetermined pull on the line to move the arm to its circuit closing position.

WILLIAM R. TEEL.

REFERENCES CITED

The following references are of record in the file of this patent:

UNITED STATES PATENTS

| Number | Name | Date |
|---|---|---|
| 532,868 | Bull | Jan. 22, 1895 |
| 1,337,292 | Timmons | Apr. 20, 1920 |
| 1,737,921 | Derr | Dec. 3, 1929 |
| 1,752,397 | See | Apr. 1, 1930 |

FOREIGN PATENTS

| Number | Country | Date |
|---|---|---|
| 178,135 | Switzerland | Sept. 2, 1935 |